United States Patent
Chu et al.

(10) Patent No.: US 9,856,787 B2
(45) Date of Patent: Jan. 2, 2018

(54) VALVE DEVICE OF TURBOCHARGER

(71) Applicants: HYUNDAI MOTOR COMPANY, Seoul (KR); KIA MOTORS CORPORATION, Seoul (KR); KEY YANG PRECISION CO., LTD., Gimcheon-si, Gyeongsangbuk-do (KR)

(72) Inventors: Dong Ho Chu, Ansan-si (KR); Kyu Sik Cho, Gimcheon-si (KR)

(73) Assignees: Hyundai Motor Company, Seoul (KR); Kia Motors Corporation, Seoul (KR); Keyyang Precision Co., Ltd., Gimcheon-si, Gyeongsangbuk-do (KR)

( * ) Notice: Subject to any disclaimer, the term of this patent is extended or adjusted under 35 U.S.C. 154(b) by 97 days.

(21) Appl. No.: 14/955,931

(22) Filed: Dec. 1, 2015

(65) Prior Publication Data

US 2017/0022890 A1    Jan. 26, 2017

(30) Foreign Application Priority Data

Jul. 22, 2015 (KR) .................. 10-2015-0103969

(51) Int. Cl.
| | | |
|---|---|---|
| F02B 37/02 | (2006.01) | |
| F02B 37/18 | (2006.01) | |
| F02B 37/22 | (2006.01) | |
| F02B 37/16 | (2006.01) | |
| F01D 17/10 | (2006.01) | |
| F02B 37/12 | (2006.01) | |

(52) U.S. Cl.
CPC .......... *F02B 37/225* (2013.01); *F01D 17/105* (2013.01); *F02B 37/025* (2013.01); *F02B 37/16* (2013.01); *F02B 37/183* (2013.01); *F02B 2037/125* (2013.01); *Y02T 10/144* (2013.01)

(58) Field of Classification Search
CPC ....... F02B 37/025; F02B 37/183; F02B 37/22
See application file for complete search history.

(56) References Cited

U.S. PATENT DOCUMENTS

2009/0028694 A1* 1/2009 Naemura .............. F01D 17/105
                                                                    415/145

FOREIGN PATENT DOCUMENTS

| JP | 2005-226591 | 8/2005 |
|---|---|---|
| JP | 2008-101589 | 5/2008 |
| KR | 10-2008-0101389 | 11/2008 |
| KR | 10-2009-0110330 | 10/2009 |
| KR | 10-2012-0014934 | 2/2012 |
| KR | 10-2013-0037729 | 4/2013 |

* cited by examiner

*Primary Examiner* — Audrey K Bradley
(74) *Attorney, Agent, or Firm* — Brinks Gilson & Lione

(57) ABSTRACT

A valve device of a turbocharger includes: a valve seat disposed on an entrance of a fluid passage divided into at least two branches, and an opening/closing valve coupled to a rotary shaft rotatably disposed adjacent to the valve seat. The valve seat has a contact surface which is flat and a dividing section which extends across the entrance and divides the entrance into two entrance sections. The opening/closing valve closes the entrance of the fluid passage disposed in the valve seat. The bottom surface of the opening/closing valve is in surface contact with the contact surface of the valve seat. The central portion of the opening/closing valve corresponding to the dividing section is spaced apart from the dividing section at a predetermined distance.

8 Claims, 3 Drawing Sheets

VALVE DEVICE OF TURBOCHARGER

CROSS-REFERENCE TO RELATED APPLICATION

The present application claims the benefit of the Korean Patent Application No. 10-2015-0103969, filed on Jul. 22, 2015, which is incorporated herein by reference in its entirety.

FIELD

The present disclosure relates to a valve device of a turbocharger that improves the endurance of a valve seat.

BACKGROUND

The statements in this section merely provide background information related to the present disclosure and may not constitute prior art.

Generally in vehicles, power generated by an engine depends on the amount of air and the amount of fuel introduced into a combustion chamber. In order to increase the power output of the engine, greater amounts of air and fuel can be supplied into the combustion chamber. For this, the size of the combustion chamber may be increased. However, the increased size of the combustion chamber increases the weight and size of the engine.

In the turbocharger, when exhaust gas rotates a turbine wheel of the turbocharger, a wheel of a coaxially-connected air compressor rotates along with the turbine wheel to supply compressed air into the combustion chamber, thereby increasing the power output of the engine. In this manner, the turbocharger can increase the power output of the engine using the exhaust gas that is to be discarded, thereby achieving advantageous effects, such as improved fuel efficiency, the reduced size of the engine, the reduced production of hazardous substances materials, and the increased output power of the engine.

However, the turbocharger has the following problems: when there is only a single passage for exhaust gas, spooling up is delayed at low revolutions per minute (RPMs), and interference occurs between flows of exhaust depending on the sequence of the strokes of the cylinder, thereby lowering efficiency.

In order to overcome this problem, a twin scroll turbocharger is applied, in which an exhaust manifold causing less interference between cylinders is coupled to the turbocharger to form two passages. This configuration removes the interference between flows of exhaust gas, allowing masses of exhaust gas to smoothly flow.

However, in the twin scroll turbocharger, we have discovered that thermal deformation is caused by hot exhaust gas flowing through two passages that diverge from a single passage. That is, when an entrance side of the passage is thermally deformed, a valve intended to close the entrance does not securely contact the entrance, whereby exhaust gas does not properly flow in an intended direction. This consequently decreases the rotation speed of the wheel within the turbocharger, thereby degrading the performance thereof.

SUMMARY

The present disclosure proposes a valve device of a turbocharger in which a valve properly closes a passage in the closing operation of the valve even in the case in which a valve seat is thermally deformed by the flow of hot exhaust gas.

In one form of the present disclosure, a valve device of a turbocharger includes: a valve seat disposed on an entrance of a fluid passage divided into at least two branches, the valve seat having a contact surface machined to be flat and a dividing section extending across the entrance, the dividing section dividing the entrance into two entrance sections; and an opening/closing valve coupled to a rotary shaft rotatably disposed adjacent to the valve seat, the opening/closing valve closing the entrance of the fluid passage disposed in the valve seat, wherein the bottom surface of the opening/closing valve is in surface contact with the contact surface of the valve seat, and the central portion of the opening/closing valve corresponding to the dividing section is spaced apart from the dividing section at a predetermined distance.

The dividing section of the valve seat may be machined to be depressed from the contact surface to a predetermined depth.

The central portion of the opening/closing valve may be machined to be depressed from the bottom surface to a predetermined depth.

The depth to which the dividing section of the valve seat is depressed may be greater than the depth to which the central portion of the opening/closing valve is depressed.

The depth to which the dividing section of the valve seat is depressed may be greater than the depth to which the central portion of the opening/closing valve is depressed by about 50% to 80%.

The diameter of the dividing section may be smaller than the entire diameter of the fluid passage.

The central portion of the opening/closing valve may be machined such that a portion thereof corresponding to the dividing section is depressed. The diameter of the central portion may be shorter than the diameter of the dividing section.

The diameter of the central portion of the opening/closing valve may be shorter than the diameter of the dividing section of the valve seat by about 40% to 70%.

The central portion of the opening/closing valve may be depressed in a semispherical shape.

The central portion of the opening/closing valve may have a shape of a circle including a portion of the entrance of the fluid passage and the dividing section.

According to the valve device of a turbocharger having the above-described configuration, even in the case in which the valve seat is thermally deformed by flows of hot exhaust gas, the valve securely, and preferably completely closes the passage through the closing operation thereof.

In this manner, exhaust gas can properly flow in an intended direction, thereby improving the performance of the turbocharger.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
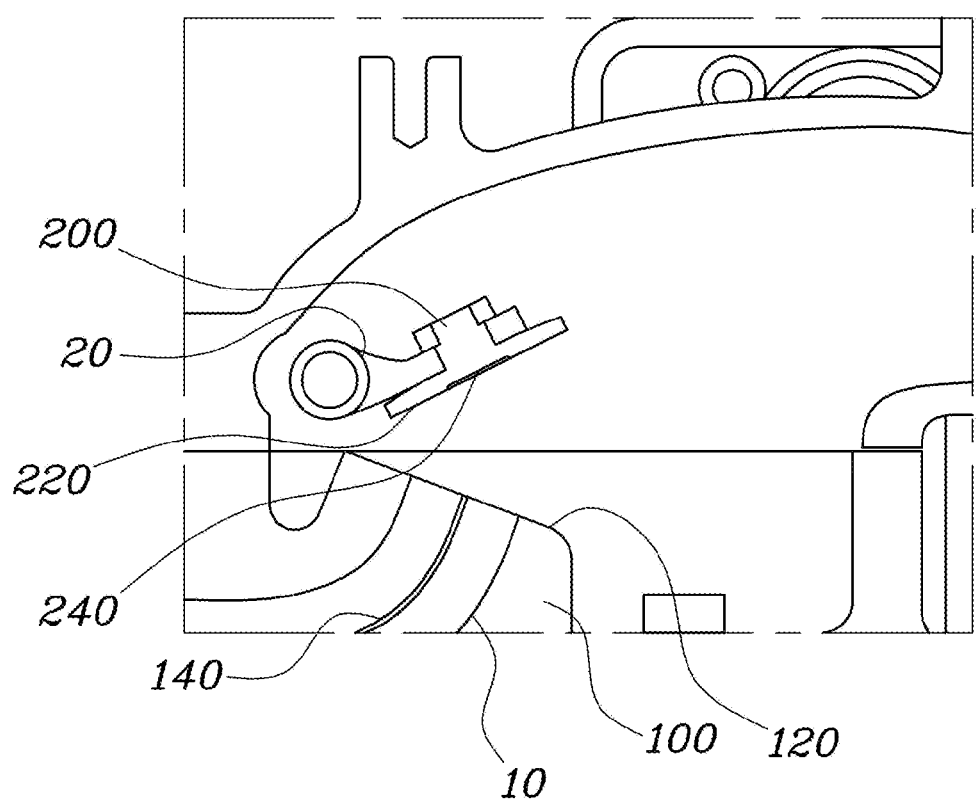
FIG. 1 is a configuration view illustrating a valve device of a turbocharger according to an exemplary embodiment of the present disclosure.
Figure 2:
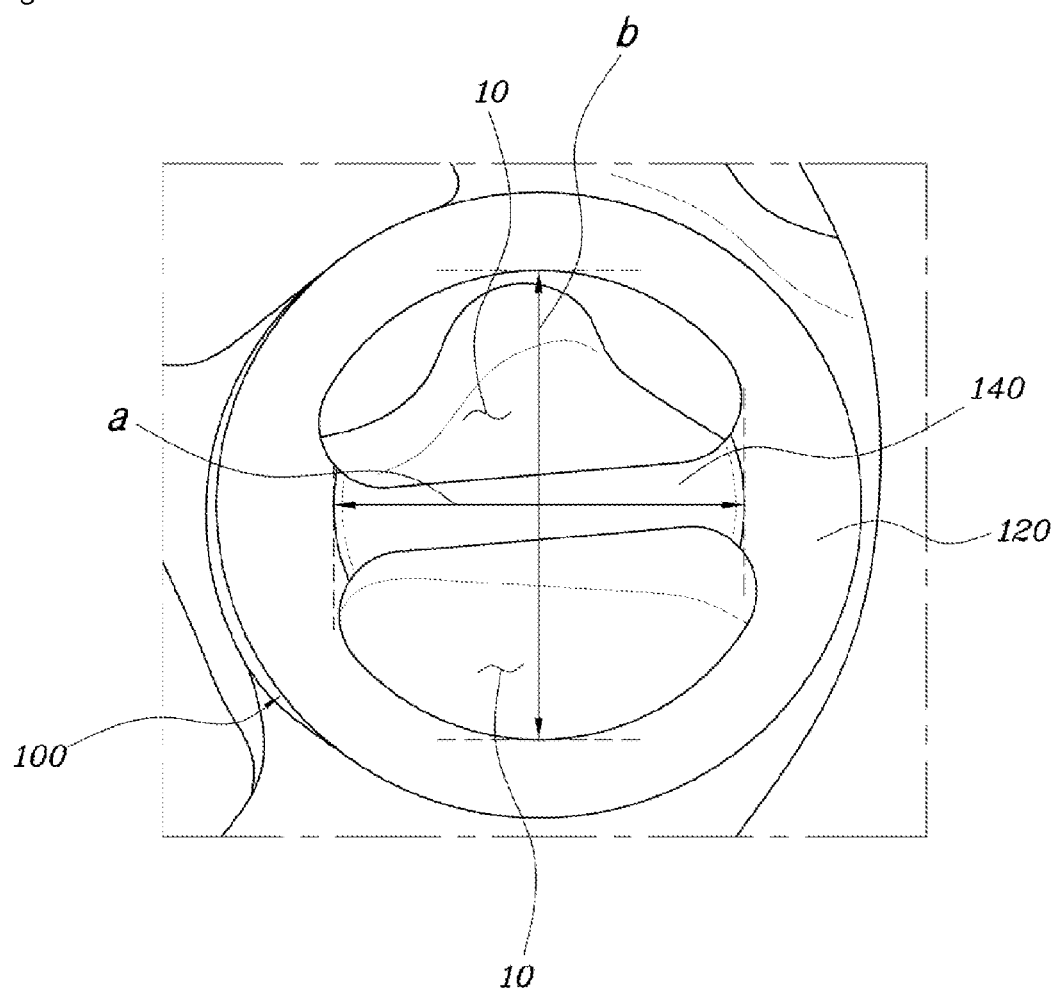
FIG. 2 illustrates the valve seat in the valve device of a turbocharger illustrated in FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The turbocharger device according to one form of the present disclosure includes a valve seat 100 and an opening/closing valve 200. The valve seat 100 is disposed on an entrance of a fluid passage 10 divided into at least two branches, has a contact surface 120 that is machined to be flat, and a dividing section 140 extending across the entrance, dividing the entrance into two entrance sections. The opening/closing valve 200 is coupled to a rotary shaft 20 that is rotatably disposed adjacent to the valve seat 100, and closes the entrance of the fluid passage 10 disposed in the valve seat 100. A bottom surface 220 of the opening/closing valve 200 is in surface contact with the contact surface 120 of the valve seat 100, and a central portion 240 of the opening/closing valve 200 corresponding to the dividing section 140 is spaced apart from the dividing section 140 at a predetermined distance.

Specifically, according to the present embodiment, the valve seat 100 is disposed at the entrance of the fluid passage 10, and includes the contact surface 120 that is machined to be flat, and the dividing section 140 that divides the entrance of the fluid passage 10. That is, the opening/closing valve 200 comes into contact with the contact surface 120 of the valve seat 100 to close the entrance of the fluid passage. An exhaust manifold causing less interference between masses of exhaust gas is divided into two or more branches, and the dividing section 140 divides the fluid passage into the corresponding branches. The present embodiment will be described in relation to an example in which the fluid passage 10 is divided into two branch passages.

The opening/closing valve 200 is coupled to the rotary shaft 20, and is configured to close the entrance of the fluid passage 10, thereby selectively closing the entrance of the fluid passage 10. Here, the bottom surface 220 of the opening/closing valve 200 prevents exhaust gas from leaking through surface contact with the contact surface 120 of the valve seat 100. The central portion 240 of the bottom surface 220 corresponds to the dividing section 140, and faces the dividing section 140 during the closing operation. In particular, the central portion 240 formed on the opening/closing valve 200 is spaced apart from the dividing section 140 at a predetermined distance in the state in which the entrance of the fluid passage 10 is closed. This configuration is based on the consideration of thermal deformation caused by the circulation of hot exhaust gas. The entrance of the fluid passage 10 has the dividing section 140 intended to prevent the interference between flows of exhaust gas. However, the dividing section 140 may be thermally deformed by hot exhaust gas. Since the thermally-deformed dividing section 140 protrudes beyond the contact surface 120 of the valve seat 100, the opening/closing valve 200 is not securely closed, thereby lowering the efficiency of the turbocharger, which is problematic.

In order to overcome this problem, according to the present embodiment, the central portion 240 of the opening/closing valve 200 is spaced apart from the dividing section 140 at a predetermined distance. With this arrangement, the thermal deformation can be absorbed by the space between the central portion 240 and the dividing section 140, whereby the opening/closing valve 200 can be securely closed, and preferably thereby closing the fluid passage 10. In particular, since the twin scroll turbocharger is applied, the present embodiment is intended to absorb the thermal deformation of the dividing section 140 that divides the entrance of the fluid passage 10. For this, the central portion 240 of the opening/closing valve absorbs the thermal deformation of the dividing section 140 that is exposed to the high-temperature heat of exhaust gas and is formed thin.

Describing the above-mentioned features in greater detail, the dividing section 140 of the valve seat 100 may be machined to be depressed from the contact surface 120 to a predetermined depth. In addition, the central portion 240 of the opening/closing valve 200 may be machined to be depressed from the bottom surface 220 to a predetermined depth. The dividing section 140 of the valve seat 100 and the central portion 240 of the opening/closing valve 200 may be precisely machined by separate cutting or grinding.

As above, the dividing section 140 of the valve seat 100 is depressed from the contact surface 120 to a predetermined depth, and the central portion 240 of the opening/closing valve 200 corresponding to the contact surface 120 is depressed from the bottom surface 220 by a predetermined depth, such that a space having a predetermined gap is defined between the dividing section 140 of the valve seat 100 and the central portion 240 of the opening/closing valve 200.

The space between the dividing section 140 of the valve seat 100 and the central portion 240 of the opening/closing valve 200 absorbs the thermal deformation of the dividing section 140 of the valve seat 100, such that the secured closing operation of the opening/closing valve 200 can be maintained thereafter.

The dividing section 140 of the valve seat 100 may be machined such that the depressed depth thereof is greater than the depth to which the central portion 240 of the opening/closing valve 200 is depressed. Here, the dividing section 140 of the valve seat 100 may be machined such that the depressed depth thereof is greater than the depth to which the central portion 240 of the opening/closing valve 200 is depressed by about 50% to 80%.

Since the dividing section 140 of the valve seat 100 is the portion that is directly exposed to hot exhaust gas and thus is subjected to greatest thermal deformation, the depth to which the dividing section 140 is depressed is set to be greater than the depth to which the central portion 240 of the opening/closing valve 200 is depressed. With this arrangement, the thermal deformation is absorbed to the amount equal to the depth to which the dividing section 140 of the valve seat 100 is depressed and the depth to which the central portion 240 of the opening/closing valve 200 is depressed. Even in the case in which the dividing section 140 of the valve seat 100 is thermally deformed, the opening/closing valve 200 can come into surface contact with the valve seat 100, thereby securely closing the entrance of the fluid passage 10.

Specifically, the dividing section 140 of the valve seat 100 may be machined such that the depressed depth thereof may be greater than the depth to which the central portion 240 of the opening/closing valve 200 is depressed by about 50% to 80%. For example, when the depth to which the dividing section 140 of the valve seat 100 is depressed 3 mm, the depth to which the central portion 240 of the opening/closing valve 200 is depressed may be set to the range from 1.5 mm to 2.4 mm.

Since the depth of the central portion 240 of the opening/closing valve 200 is set to range from about 50% to about 80% of the depth of the dividing section 140 of the valve seat 100 as above, the space between the dividing section 140 of the valve seat 100 and the central portion of the opening/closing valve 200 may sufficiently absorb the thermal deformation. This configuration may also inhibit or prevent the interference in the exhaust gas between the divided entrance sections of the fluid passage 10 from being caused by an excessive space between the central portion 240 and the dividing section 140.

The diameter "a" of the dividing section 140 may be set to be smaller than the entire diameter "b" of the fluid passage 10. That is, the dividing section 140 of the valve seat 100 crossing the fluid passage 10 is formed to be shorter than the entire diameter "b" of the fluid passage 10, whereby the thermal deformation of the localized portion caused by hot exhaust gas can be absorbed. In addition, the dividing section 140 is formed at the entrance of the fluid passage 10, but the thickness thereof is not sufficiently obtained. Therefore, the dividing section 140 is formed to be shorter than the fluid passage 10 in order to reduce the thermal deformation.

The central portion 240 of the opening/closing valve 200 may be machined such that the portion thereof corresponding to the dividing section 140 is depressed and the diameter "c" thereof is smaller than the diameter "a" of the dividing section 140. That is, the diameter "c" of the central portion 240 of the opening/closing valve 200 is formed to be smaller than the diameter "a" of the dividing section 140, such that the central portion 240 of the opening/closing valve 200 can absorb the thermal deformation of the central portion of the dividing section 140 that is subjected to the greatest amount of localized deformation when the dividing section 140 is thermally deformed by hot exhaust gas.

Specifically, the diameter "c" of the central portion 240 of the opening/closing valve 200 may be formed to be smaller than the diameter "a" of the dividing section 140 of the valve seat 100 by, approximately, 40% to 70%. For example, when the diameter "a" of the dividing section 140 formed on the valve seat 100 is 30 mm, the diameter "c" of the central portion 240 formed on the opening/closing valve 200 is set to the range from 12 mm to 21 mm.

This configuration can absorb a change in the depth caused by the portion of the dividing section 140 of the valve seat 100 that protrudes due to thermal deformation. The depressed central portion 240 is not set to an excessive depth or diameter, such that the overall endurance of the opening/closing valve 200 is not reduced.

Figure 3:
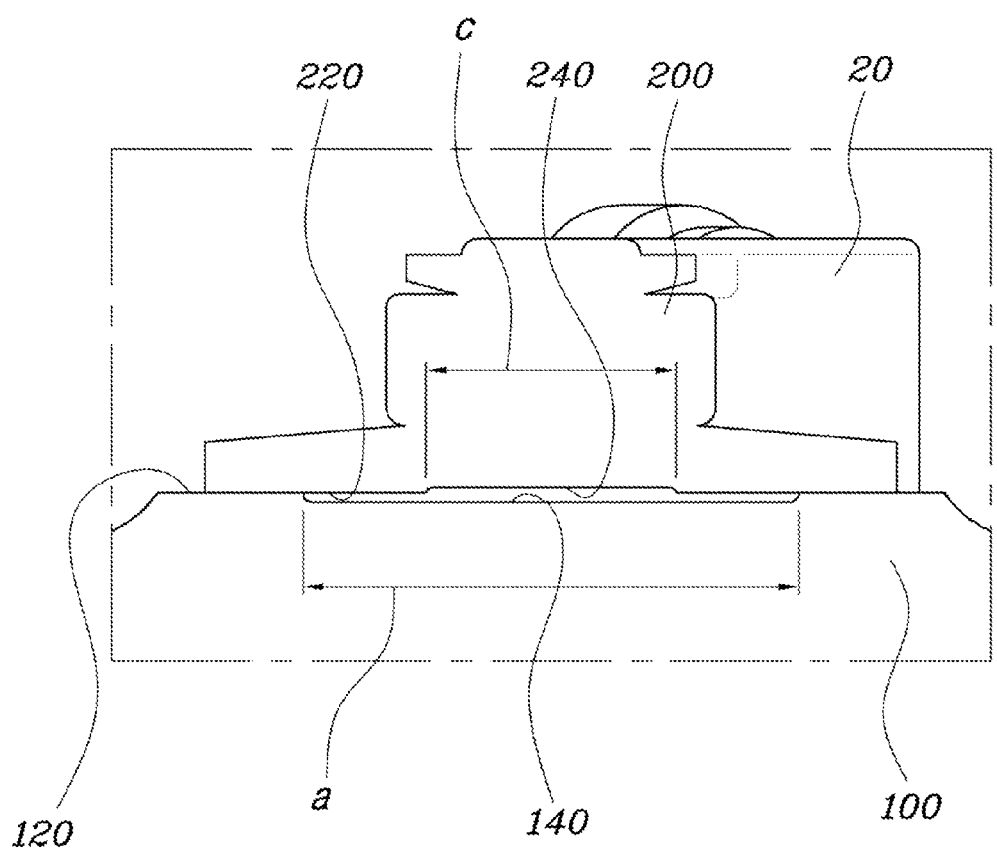
FIG. 3 illustrates the valve and the valve seat in the valve device of a turbocharger illustrated in FIG. 1.

The central portion 240 of the opening/closing valve 200 may be depressed in a hemispherical shape. In addition, the central portion 240 of the opening/closing valve 200 may be formed in the shape of a circle including a portion of the entrance of the fluid passage 10 and a portion of the dividing section 140. When the dividing section 140 is thermally deformed by hot exhaust gas, the central portion thereof is subjected to the greatest localized deformation and bulges up. Considering this feature, the central portion 240 of the opening/closing valve 200 is machined such that the central portion 240 is depressed in the hemispherical shape in the central direction. Since the dividing section 140 of the valve seat 100 is positioned within the central portion 240 of the opening/closing valve 200 in the top-bottom direction (as illustrated in FIG. 3), the central portion 240 of the opening/closing valve 200 can efficiently absorb the thermal deformation of the dividing section 140.

According to the valve device of a turbocharger having the above-described configuration, even in the case in which the valve seat 100 is thermally deformed by flows of hot exhaust gas, the valve securely closes the passage through the closing operation thereof.

In particular, since the thermal deformation of the dividing section 140 of the valve seat 100 exposed to the greatest amount of heat of exhaust gas is efficiently absorbed, the opening/closing valve 200 can come into surface contact with the valve seat 100, thereby preventing the opening/closing valve 200 from being abraded and absorbing noise caused by the vibration of the valve.

In this manner, exhaust gas can properly flow in an intended direction, thereby improving the performance of the turbocharger.

Although an embodiment of the present disclosure has been described for illustrative purposes, those skilled in the art will appreciate that various modifications, additions and substitutions are possible, without departing from the scope and spirit of the present disclosure as disclosed in the accompanying claims.

What is claimed is:

1. A valve device of a turbocharger comprising:
   a valve seat disposed on an entrance of a fluid passage, the fluid passage being divided into at least two branches, the valve seat including a contact surface machined to be flat and a dividing section extending across the entrance, the dividing section configured to divide the entrance into at least two entrance sections; and
   an opening/closing valve coupled to a rotary shaft, the rotary shaft being rotatably disposed adjacent to the valve seat, the opening/closing valve configured to close the entrance of the fluid passage disposed in the valve seat,
   wherein the opening/closing valve has a bottom surface and a central portion, the bottom surface being in surface contact with the contact surface of the valve seat,
   wherein the central portion of the opening/closing valve corresponding to the dividing section is spaced apart from the dividing section at a predetermined distance, and
   wherein a depth to which the dividing section of the valve seat is depressed is greater than a depth to which the central portion of the opening/closing valve is depressed by 50% to 80%.

2. The valve device according to claim 1, wherein the dividing section of the valve seat is machined to be depressed from the contact surface to a predetermined depth.

3. The valve device according to claim 1, wherein the central portion of the opening/closing valve is machined to be depressed from the bottom surface to a predetermined depth.

4. The valve device according to claim 1, wherein a diameter of the dividing section is smaller than an entire diameter of the fluid passage.

5. The valve device according to claim 1, wherein the central portion of the opening/closing valve has a shape of a circle including a portion of the entrance of the fluid passage and the dividing section.

6. The valve device according to claim 1, wherein the central portion of the opening/closing valve is machined such that a portion thereof corresponding to the dividing section is depressed, and a diameter of the central portion is shorter than a diameter of the dividing section.

7. The valve device according to claim 6, wherein the diameter of the central portion of the opening/closing valve is shorter than the diameter of the dividing section of the valve seat by 40% to 70%.

8. The valve device according to claim 6, wherein the central portion of the opening/closing valve is depressed in a semispherical shape.

* * * * *